(12) United States Patent
Victor et al.

(10) Patent No.: US 8,497,880 B2
(45) Date of Patent: Jul. 30, 2013

(54) METHOD AND SYSTEM FOR PRESENTING INFORMATION

(75) Inventors: Trent Victor, Göteborg (SE); Johan Jarlengrip, Göteborg (SE)

(73) Assignee: Volvo Technology Corporation, Göteborg (SE)

( * ) Notice: Subject to any disclaimer, the term of this patent is extended or adjusted under 35 U.S.C. 154(b) by 602 days.

(21) Appl. No.: 11/421,493

(22) Filed: Jun. 1, 2006

(65) Prior Publication Data

US 2008/0079753 A1    Apr. 3, 2008

Related U.S. Application Data

(63) Continuation of application No. PCT/EP2004/013631, filed on Dec. 1, 2004.

(30) Foreign Application Priority Data

Dec. 1, 2003  (WO) .................. PCT/EP03/13479

(51) Int. Cl.
*G09G 5/00* (2006.01)
(52) U.S. Cl.
USPC ............................................. 345/660
(58) Field of Classification Search
USPC .................................. 345/427, 660
See application file for complete search history.

(56) References Cited

U.S. PATENT DOCUMENTS

| | | | |
|---|---|---|---|
| 5,289,185 A | | 2/1994 | Ramier et al. |
| 5,731,805 A * | | 3/1998 | Tognazzini et al. ........... 345/156 |
| 5,777,715 A * | | 7/1998 | Kruegle et al. ............... 351/158 |
| 5,880,734 A * | | 3/1999 | Light ............................ 345/419 |
| 6,327,522 B1 * | | 12/2001 | Kojima et al. ..................... 701/1 |
| 6,977,630 B1 | | 12/2005 | Donath et al. |
| 2001/0028352 A1 * | | 10/2001 | Naegle et al. ................. 345/501 |
| 2002/0032524 A1 | | 3/2002 | Schott et al. |
| 2002/0067366 A1 | | 6/2002 | Hirao et al. |
| 2002/0101568 A1 * | | 8/2002 | Eberl et al. .................... 351/211 |
| 2002/0167461 A1 * | | 11/2002 | Bronson ........................... 345/7 |
| 2003/0045973 A1 | | 3/2003 | Okamoto |

(Continued)

FOREIGN PATENT DOCUMENTS

| | | |
|---|---|---|
| EP | 0846588 A | 6/1998 |
| EP | 1235052 A | 8/2002 |

(Continued)

OTHER PUBLICATIONS

International Search Report for corresponding International Application No. PCT/EP2004/013631.

(Continued)

*Primary Examiner* — Edward Martello
(74) *Attorney, Agent, or Firm* — WRB-IP LLP

(57) ABSTRACT

Methods and systems are disclosed for presenting information for viewing by a driver of, e.g., a vehicle, of a train, a captain of a ship, a pilot of an airplane, or by any other person who has to gaze in a certain direction, especially for observing or monitoring the environment such as a road in case of a vehicle driver. The information is presented in such a way that such a person is less impaired with respect to his ability to detect changes in the environment when reading such information so that safety especially of driving a vehicle is considerably improved.

39 Claims, 5 Drawing Sheets

U.S. PATENT DOCUMENTS

| | | | |
|---|---|---|---|
| 2003/0169213 A1* | 9/2003 | Spero | 345/7 |
| 2003/0187577 A1 | 10/2003 | McClure et al. | |
| 2004/0066376 A1* | 4/2004 | Donath et al. | 345/169 |
| 2004/0207632 A1* | 10/2004 | Miller et al. | 345/599 |

FOREIGN PATENT DOCUMENTS

| | | |
|---|---|---|
| JP | 07-156685 | 6/1995 |
| JP | 07-280592 A | 10/1995 |
| JP | 7257228 | 10/1995 |
| JP | 08-241493 | 9/1996 |
| JP | 09-265054 | 10/1997 |
| JP | 10176928 | 6/1998 |
| JP | 2000211452 | 8/2000 |
| JP | 2003054334 A | 2/2003 |
| JP | 2003 291688 A | 10/2003 |
| JP | 2003-341383 A | 12/2003 |
| WO | 2005053991 A1 | 6/2005 |
| WO | 2005055189 A1 | 6/2005 |

OTHER PUBLICATIONS

International Preliminary Examination Report for corresponding International Application No. PCT/EP2004/013631.

International Search Report for related International Application PCT/EP2003/013479 (with International Application).

International Search Report for related International Application PCT/EP2004/013632 (with International Application).

Translation of Official Action from corresponding Japanese Application 2006-541882.

Translation of Official Action from corresponding Japanese Application No. 2006-541881.

Translation of Official Action from corresponding Japanese Application No. 2006-541882.

Patent Abstracts of Japan Publication No. 64-083424, published Mar. 29, 1989; Honda Motor Co Ltd.

* cited by examiner

METHOD AND SYSTEM FOR PRESENTING INFORMATION

The present application is a continuation of International Application PCT/EP2004/013631, filed Dec. 1, 2004, which claims priority to International ApplicationPCT/EP03/13479, filed Dec. 1, 2003, both of which are incorporated by reference.

BACKGROUND AND SUMMARY

The invention relates to a method and system for presenting or reproducing information in a viewing especially of a driver of a vehicle, or a train, or a captain of a ship, or a pilot of an airplane or of any other person who has to gaze in a certain direction, especially for observing or monitoring the environment like for example a road in case of a vehicle driver.

It is generally known that for safely driving a vehicle the driver has to look predominantly onto the road for observing the traffic and avoiding accidents. However, especially drivers in current vehicles are often required to look away from the road and into the interior of the vehicle. For example, the driver frequently needs to directly fixate (look straight at) the speedometer, the radio or navigation displays and he must be able to read and understand the information presented there and to operate these and other devices, additionally to driving the vehicle and monitoring the traffic.

Any glances away from the road for example into the interior of the vehicle can potentially cause an unsafe driving situation because the driver's ability to detect changes in the on-road environment is reduced. Off-road glances lead to undesirable safety consequences such as increased variability of lane-keeping performance, lane exceedencies, increased brake reaction times, missed events and more.

SE 0201571-7 discloses a device for indicating an operational state of a vehicle comprising a display unit which shows graphical information in the form of an arc shaped scale extending from a first angle to a second angle and a number of numerals. The operational state is indicated by a first segment which extends from the first angle to a third variable angle and which assumes a state that is visually distinguishable from the second segment between the third and the second angle. Furthermore in order to increase the legibility of the operational state each numeral is arranged to be able to assume a first normal format and a second larger format, wherein the latter is activated in the area around the relevant operational state.

This device is provided to reduce the time for transmitting the information concerned, like for example the speed of a vehicle, while retaining the precision, whereby the driver is able to keep his attention directed towards the current driving situation to a greater extent.

It is desirable to provide a method and system by which the above mentioned risks can be further reduced and the safety especially of driving a vehicle can be further increased.

It is desirable to provide a method and system for presenting or reproducing information in such a way that especially a person mentioned in the first paragraph who is operating a vehicle, airplane, ship or train, is less impaired with respect to his ability to detect changes in the environment, when reading such information.

It is desirable to provide a method and system by which the number of glances away from the environment which has to be observed in order to read information by a person mentioned in the first paragraph is further reduced.

According to an aspect of the present invention, a method for presenting or reproducing information in a person's view with at least one display device comprises selecting a presentation or reproduction of the information by at least one display device for recognition by foveal vision or by peripheral vision, and adapting the presentation or reproduction of the information according to the selection with respect to at least one of its magnitude, size, contrast, and intensity in dependency on whether the information is to be recognized by foveal vision or by peripheral vision of the person.

According to another aspect of the invention, a method for presenting or reproducing information in a person's view with at least one projection or head mounted display device comprises detecting at least one of a gaze direction and a gaze point of the person, presenting or reproducing the information so that it is recognizable by foveal vision or by peripheral vision in dependency on an eccentricity between the at least one of the gaze direction and the gaze point and the location of the presentation or reproduction of the information, and continuously adapting the presentation or reproduction of the information with respect to at least one of its magnitude, size, contrast, and intensity according to a loss of acuity of the eye of the person with increasing eccentricity in peripheral vision.

According to another aspect of the invention, a method for presenting or reproducing information in a person's view with at least one projection or head mounted display device comprises detecting at least one of a gaze direction and a gate point of the person, presenting or reproducing the information in a predetermined constant visual angle relative to the at least one of the gaze direction and the gaze point and with a predetermined constant magnification in a peripheral vision of the person, so that the presentation or reproduction of the information follows the at least one of the gaze direction and the gaze point of the person.

According to another aspect of the invention, a system for presenting or reproducing information in a person's view comprises at least one display device, a switching arrangement to be operable by the person for switching the system between a "Peripheral-Vision Information On"-state and a "Foveal-Vision Information On"-state, and a control device for controlling the at least one display device according to the operation of the switch, for adapting the presentation or reproduction of the information with respect to at least one of its magnitude, size, contrast, and intensity depending on whether the information is to be recognized by foveal vision or by peripheral vision of the person.

According to another aspect of the invention, a system for presenting or reproducing information in a viewing of a person comprises at least one projection or head mounted display device, a sensor for detecting at least one of a gaze direction and a gaze point of the person, a control device for controlling the at least one display device for presenting or reproducing the information so that it is recognizable by foveal vision or by peripheral vision, in dependency on an eccentricity between the at least one of the gaze direction and the gaze point and the location of the presentation or reproduction of the information, and for continuously adapting the presentation or reproduction of the information with respect to at least one of its magnitude, size, contrast, and intensity according to a loss of acuity of the person's eye with increasing eccentricity in peripheral vision.

According to another aspect of the invention, a system for presenting or reproducing information of a person's view comprises at least one projection or head mounted display device, a sensor for detecting at least one of a gaze direction and a gaze point of the person, and a control device for controlling the at least one display device for presenting or reproducing the information in a predetermined constant visual angle relative to the at least one of the gaze direction and the gaze point and with a predetermined constant magnification in a peripheral vision of the person, so that the presentation or reproduction of the information follows the at least one of the gaze direction and the gaze point of the person.

One advantage of aspects of the invention is that they can be realized in a mobile embodiment for example by means of a portable computer for controlling helmet-mounted, visor-mounted or eyeglass-mounted display devices, so that it is not necessary to install the system according to the invention stationary within a vehicle, train, airplane or ship.

BRIEF DESCRIPTION OF THE DRAWINGS

Further details, features and advantages of the invention are disclosed in the following description of preferred and exemplary embodiments of the invention with reference to the drawings in which shows.

DETAILED DESCRIPTION

According to the invention, especially a driver of a vehicle (or any other person mentioned in the introductory part of the description) is enabled to read or recognize information by peripheral vision when his gaze is not directed at, or close to, an in-vehicle display or head-up display. The information is presented by means of a display device in such a way that the driver's eye movements towards the information image (i.e., the presentation or reproduction of the information) and subsequent eye-fixations upon the information image are not necessary. The information is readable or recognizable without having to move the eyes off the road. The information is presented as simply and large enough to enable information extraction by peripheral vision.

In order to achieve this, the following considerations have to be made: It is generally known that the visual acuity of a human eye is greatest at the gaze point a person is looking at (which is defined as the visual or gaze direction) and an area which extends to about the gaze point (angle of eccentricity). This area of maximum of visual acuity is called foveal vision area or fovea. The area surrounding this foveal vision area is called peripheral vision area in which the visual acuity decreases with increasing angle from the visual gaze direction (or eccentricity). The area between and also called the parafovea.

An approximation of this decrease or decline in visual acuity is given by the following equation (1) which is disclosed in: Findlay and Gilchrist "Active Vision", Oxford 2003:

$$V_e = V_f/(1+E/E_S) \quad (1)$$

in which is the visual acuity at eccentricity E, $V_f$ is the visual acuity at the fovea and $E_s$ is a scaling constant (for grating acuity, the constant is approximately 2.5°).

Figure 1:
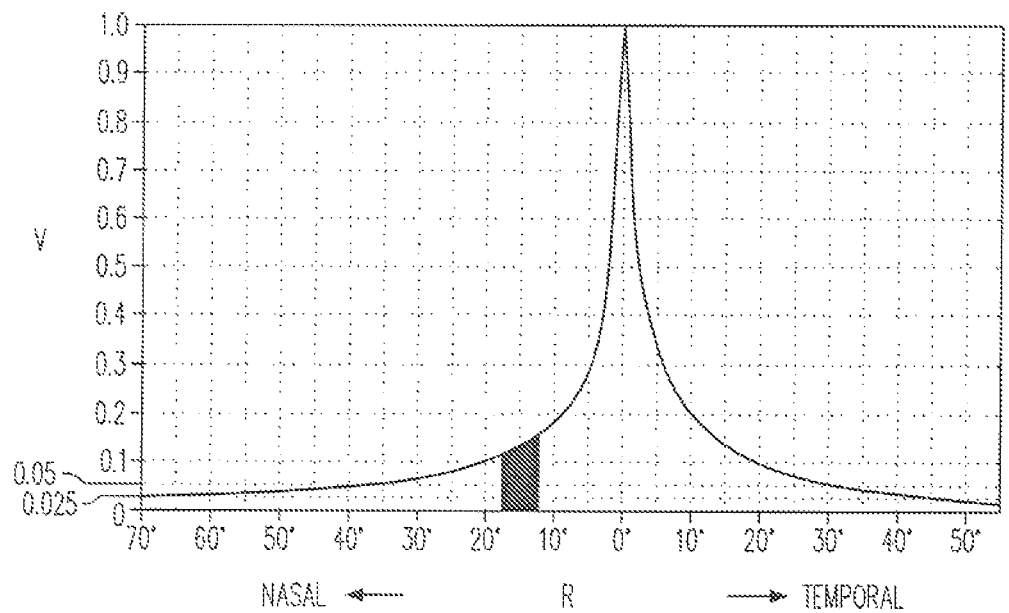
FIG. 1 is a diagram of the relative acuity of vision of a human eye.

FIG. 1 (taken out from Findlay and Gilchrist, see above) shows a diagram of this relative acuity V of vision (vertical axis) of a human eye in the nasal and temporal (i.e., to the temple) angular direction on the retina R in degree (horizontal axis) wherein 0° denotes the gaze direction. The blind spot on the retina is indicated by a black area.

Usually, information is presented to a driver in such a way (especially with respect to its magnitude and/or thickness of letters or symbols and/or complexity and volume of content) that he can recognize it only by his foveal vision but not by his peripheral vision. This has the consequence that every time the driver wants to read such information he has to direct his view away from the road and onto the display on which the information is presented or reproduced.

To be readable by peripheral vision when directing the gaze onto the road, the size of the information, like especially text and line size of the presented or reproduced information, have to be enlarged and simplified to compensate for the loss of visual acuity in peripheral vision. The amount of such enlargement and simplification increases according to FIG. 1 in dependency on the angle of eccentricity in which the information is presented relative to the gaze direction. The rules for the enlargement and simplification of information can be determined by trial and error or from the above established knowledge of contingencies.

Simplifying equation (1) above, a regression line can be used as an alternative to determine this enlargement. A best fitting regression line for visual acuity loss has been found by Anstis (1974, mentioned in Findlay and Gilchrist, see above) to be the following equation (2):

$$y = 0.046x - 0.031 \text{deg} \quad (2)$$

wherein y is the threshold letter height in degree at which the letter could just be recognized and x is the retinal eccentricity in degree.

Figure 2:
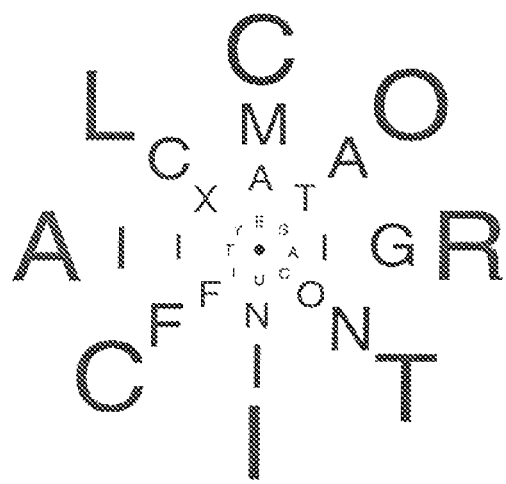
FIG. 2 is a representation of letters which are equally magnified with ten times stimuli threshold size.

Thus, for every degree of visual angle the minimum discriminable size increases by about 2.5 minutes of arc. FIG. 2 shows such an equal magnification of letters on the basis of this equation (2) at ten times stimuli threshold size. If the viewer's gaze is directed on the central dot then the letters surrounding this dot are nearly equally "good" readable.

Figure 3:
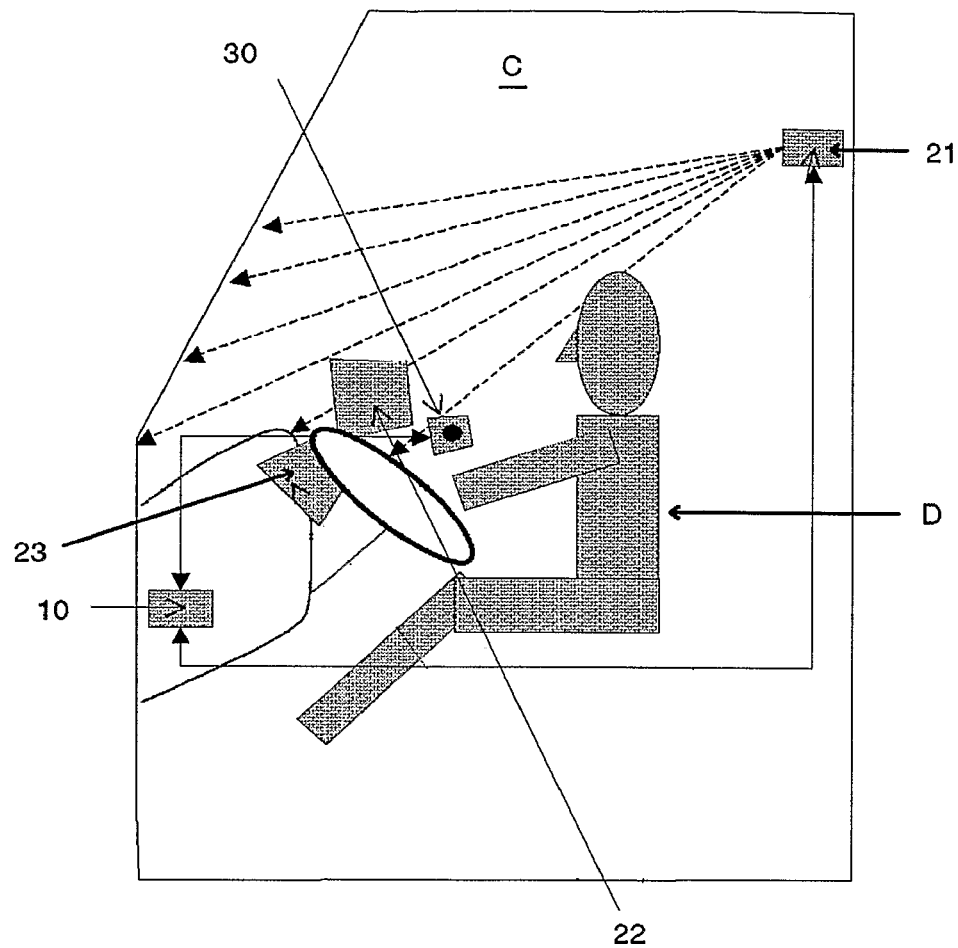
FIG. 3 is a schematic view of a first embodiment of a system according to the invention.

FIG. 3 shows a side view into the cabin C of a vehicle with a driver D who is driving the vehicle and shows a first embodiment of a system for presenting or reproducing information according to the invention.

A main component of this system is a control device 10 for receiving information data to be displayed to the driver D and for processing these data so that at least one of the display devices 21, 22, 23 can be controlled for presenting or reproducing the information data to the driver D.

A first display device is for example a laser projector 21 which is. provided and installed to project the information data for example onto a certain location of the windscreen of the vehicle or onto the dashboard. A second display device is for example a usual screen 22 installed at a dashboard, and a third display device is for example a head-down display 23 (or a head-up display) for presenting the information data to the driver.

The term "display device" is used in this disclosure to refer to any source of visual information presentation to the driver. Examples of displays include conventional computer displays, e.g., Liquid Crystal Displays (LCD) or similar, used to present GPS-based navigation and map information or other electronic devices, displays in the instrument panel, head-up displays, light emitting diodes (LEDs), and other projection displays. Helmet-mounted-, visor-mounted-, eyeglass-mounted displays can also be used.

An example of a projection display is a commercially available diode laser (see e.g., www.lasershow.se) which is capable of producing color picture stimuli. A picture stimulus is made up of a single laser beam which is moved around so quickly that the impression of an image is generated. The beam is controlled by two small electromagnetic motors (x-, and y-axis) with a small mirror on the motor axis. The use of a number of different lasers is advantageous, including a red and/or blue green laser. However, in many applications it is sufficient to use a simple, inexpensive laser, such as those commonly used for as pointing devices for presentations in an auditorium; an automotive grade laser could be used as well.

Furthermore, the system comprises switching arrangement such as a push button or switch 30 on the instrument panel or steering wheel to be operated by the driver D for switching the system between a "Peripheral-Vision Information On"-state and a "Foveal-Vision Information On"-state.

In this first embodiment of the system, the gaze position of the driver D is not detected and evaluated. This system is designed in such a way that the driver D can decide by operating the push button or switch 30 whether the information is presented or reproduced by one of the display devices 21,22, 23 in a way so that it is adapted to be recognized by peripheral vision or by foveal vision.

The control device 10 is provided to control the display device (s) 21,22, 23 such that in the "Foveal-Vision Information On"-state the information is presented or reproduced for the foveal vision of the driver and in the "Peripheral-Vision Information On"-state the information is presented or reproduced for the peripheral vision of the driver. To be recognizable by the driver, the size of the peripheral information presentation or reproduction has to be enlarged and possibly simplified in comparison to the foveal vision presentation or reproduction as explained above.

Preferably, the magnification and simplification for the peripheral information presentation/reproduction is predetermined and preset as fixed values either on the basis of eccentricity to the road center. For evaluating these values, the above equations (1) or (2) can be used or they are evaluated by try and error.

In the "Foveal-Vision Information On"-state the information is presented with a smaller size according to the enhanced visual acuity, e.g., by projecting the related image onto the windscreen in a location which is in the foveal vision area of the driver D.

Preferably, the driver D can additionally select which kind of information he wants to select to be presented either in his foveal vision and/or in his peripheral vision.

Furthermore, the peripheral of information can be provided either magnified (and possibly simplified) so that it is readable when directing the gaze onto the road, or in the usual manner i.e., without any magnification so that the driver can read it only when directing his gaze away from the road onto the related display.

Such selections can especially be made for reasons of a limited area to present information because the peripherally indicated information is presented in large size.

As an alternative, the selection can be made on the basis of the importance of the information. For example most relevant information like safety or collision warning is presented or reproduced in the foveal vision, less important information like navigation information is presented or reproduced peripherally and enlarged and simplified for recognizing in peripheral vision and all other information is presented or reproduced peripherally as well but in normal size for recognizing only when directing the gaze on it.

Another switch (not shown) can preferably be provided for selecting these types of information.

Figure 5:
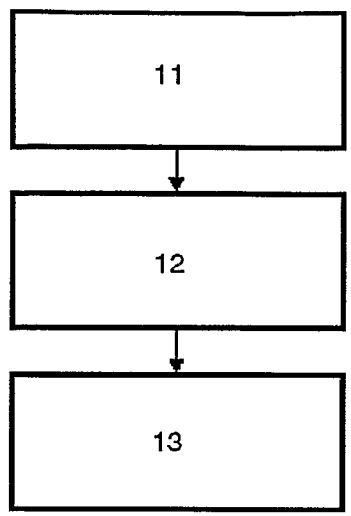
FIG. 5 is a block diagram of method steps for processing data in the system according to FIG. 4.
Figure 4:
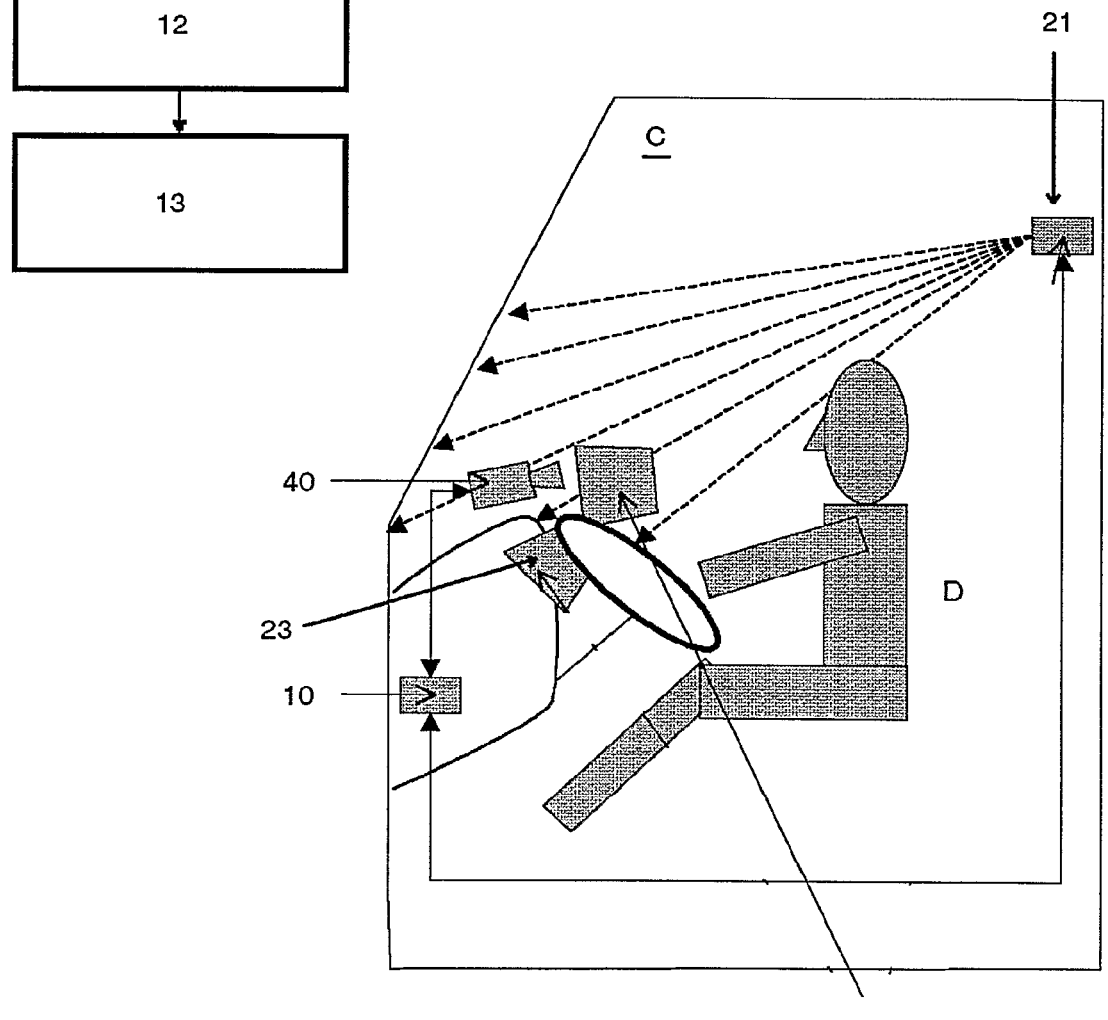
FIG. 4 is a schematic view of a second embodiment of a system according to the invention.

FIGS. 4 and 5 show a second embodiment of the invention in which the gaze position or gaze direction of a driver D is detected and evaluated.

FIG. 4 again shows a side view into the cabin C of a vehicle with a driver D who is driving the vehicle. This second embodiment of a system for presenting information according to the invention again comprises a control device 10 for receiving information data to be presented to the driver D and for processing these data, which shall be described below with reference to FIG. 5.

The system comprises at least one of the display devices 21,22, 23 as explained with reference to FIG. 3. Furthermore a visor or head mounted display (not shown) could be used which is as well controlled by the control device 10 for presenting information to the driver D. Finally, this system comprises a visual behavior sensor 40 for eyetracking which is for example a camera mounted on the dashboard or another sensor which can be head mounted for detecting the gaze direction or gaze position of the driver D and which is connected to the control device 10.

This second embodiment can also be called a gaze-contingent peripheral vision information display system.

FIG. 5 shows a block diagram of substantial method steps conducted within the control device 10. In a first step gaze position data or gaze direction data are received from the sensor 40.

In a second step 12 these data are evaluated so that an information about the gaze direction or the gaze position of the driver D obtained. In dependency on this gaze position or gaze direction data, it is calculated and determined whether on the basis of the location of an image presented or reproduced by one or more of the display devices 21 to 23 in relation to the gaze direction or gaze point this image is in a foveal vision area or in a peripheral vision area of the driver.

In a third step 13 at least one of the display devices 21 to 23 is accordingly controlled and/or adapted so that if the image is in the foveal vision area in which the driver D directs his gaze onto the image, this image is presented or reproduced in normal size vision state of the display device) according to the enhanced acuity in foveal vision. If the image is in the peripheral vision area in which the driver D directs his gaze, e.g., onto the road or into the environment, the image is presented in enlarged size and possibly simplified (peripheral vision state of the display device) so that he can recognize it in his peripheral vision.

As previously mentioned in connection with FIG. 4, this second embodiment of the system could as well be provided so that the driver D can select (e.g., by operating a switch) the information which he wants to be presented in an accordingly enlarged and possibly simplified manner if it is to be recognized by his peripheral vision.

The instantaneous sensing of gaze position or gaze direction of the driver according to the first step 11 can be conducted by a system as e.g., disclosed in the WO filed on 15 Oct. 2003, which by reference is made to a part of this disclosure.

With this second embodiment, the following information presentation alternatives can be employed:

First, the display devices 21 to 23 can automatically be switched by the control device 10 between two modes of information presentation/reproduction based on the evaluation of gaze position or gaze direction data in the second step 12, namely either a foveal vision state (state 1) or a peripheral vision state (state 2).

In the foveal vision state the information is presented by at least one of the display devices 21 to 23 in the standard format found in usual known display devices.

In the peripheral vision state the information is presented by at least one of the display devices 21 to 23 in such a way as to be readable or recognizable by the driver in his peripheral vision. In order to achieve this, the magnification factor is set at a single value which is predetermined in dependency on the actual eccentricity of the location of the (peripheral) imaging of the information relative to the gaze direction of the driver, i.e., his view onto the road as explained above in connection with the first embodiment of the invention.

This binary, on-off calculation of either a peripheral or a foveal vision state has the advantage that it can be realized with a simple and robust system.

As an alternative, it is also possible to have a graded presentation as opposed to the above binary, on-off approach. In this second alternative, the distance between the image presented or reproduced by the display device 21 to 23 and the gaze position or gaze direction is continuously determined and the presentation characteristics is adjusted to fit that particular distance in a more specific, tailored way especially on the basis of the increasing loss of visual acuity with increasing eccentricity as explained above with reference to FIG. 2 or equation (1) or (2).

For example, the size of text can be enlarged or reduced depending on the exact distance or angle between the gaze point of the eye of the driver and the location of the image generated by the at least one display device 21 to 23.

Consequently, if according to this second alternative the information presented increases its size as indicated in FIG. 2 continuously with visual angle, the magnification size is directly tied to the loss of visual acuity which increases with increasing visual angle.

FIGS. 6A to D show examples of such a gaze-contingent peripheral-vision system for presenting information using a first kind of display, namely a numeral indication at a first display 50 e.g., of a vehicle condition (speedometer) and an arrow indication at a second display 51 controlled e.g., by a navigation system.

In FIGS. 6 to 9 the actual gaze points G of a driver are indicated by a cross.

According to FIG. 6A the gaze is directed straight onto the road. Assuming that the numeral indication at the first display 50 and the arrow indication at the second display 51 each have the same distance from the gaze point G, both indications are presented or reproduced in a medium size format.

If the gaze is directed according to FIG. 6B onto the numeral indication at the first display 50, the presentation of this indication is reduced in size according to the enhanced acuity in foveal vision of the driver, and the arrow indication at the second display 51 is enlarged in size and/or in thickness because of the now greater distance between the gaze point G and the arrow indication at the second display 51 in comparison to FIG. 6A.

According to FIG. 6C the driver is looking into the environment far away from the road. In this case the presentation of the numeral indication at the first display 50 is enlarged in size (and possibly in thickness as well) to such an extend that it can be red by the driver in his peripheral vision. The large distance between the gaze point G and the numeral indication at the first display 50 in this case requires a strong magnification. Simultaneously the arrow indication at the second display 51 is presented substantially in the same size and/or thickness as in FIG. 6A because the gaze point G in FIG. 6C has substantially the same distance from the arrow indication at the second display 51 as in FIG. 6A.

Finally, in the example shown in FIG. 6D the driver is gazing onto the arrow indication at the second display 51 of the navigation system. In this case this arrow indication at the second display 51 is in his foveal vision so that it is reproduced with its normal (small) size. The numeral indication at the first display 50, however, is again indicated in a medium size so that it can be recognized by the driver in his peripheral vision.

Figure 6:
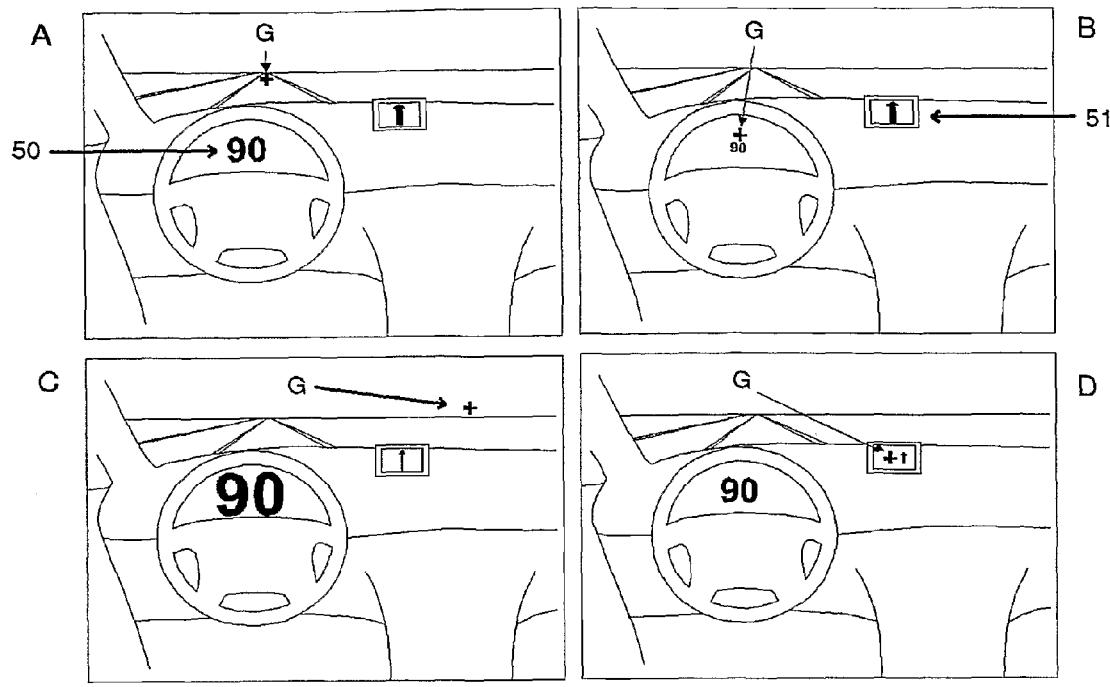
FIG. 6 shows examples of gaze-contingent peripheral-vision information presentation according to the invention using a first kind of display.

FIGS. 7A to D show examples of a gaze-contingent peripheral-vision system using a second display technology in which instead of the numeral indication at the first display 50 according to FIG. 6 a first display 60 with an analog scale indication is provided. Additionally, second display 61 with an arrow indication is provided which is controlled e.g., by a navigation system, wherein the gaze points G of the driver are again indicated by a cross.

If the gaze is directed straight onto the road according to FIG. 7A both indications at both displays 60,61 again have a similar medium size due to the substantially same distance of both displays 60,61 from the gaze point.

According to FIG. 7B the driver is gazing directly onto the analog indication at the first display 60 so that its size is reduced according to the high acuity of foveal vision of the driver whereas the size and/or thickness of the arrow indication at the second display 61 is increased according to the larger distance of this indication from the gaze point G.

FIG. 7C again shows that the driver is looking into the environment far away from the road so that the image of the analog indication at the first display 60 has to be magnified to a great extent according to the large distance between the gaze point G and this indication, whereas the arrow indication at the second display 61 has a smaller size and/or thickness as in FIG. 7A because of the smaller distance between the gaze point G and this indication.

Finally, in the case of FIG. 7D in which the driver is gazing at the arrow indication at the second display 61, this is reduced in size and/or thickness according to the enhanced acuity of foveal vision of the driver, whereas the analog indication at the first display 60 again has a medium size which is comparable with the indication in FIG. 7A because of substantially the same distance of the gaze point G from this indication.

Figure 7:
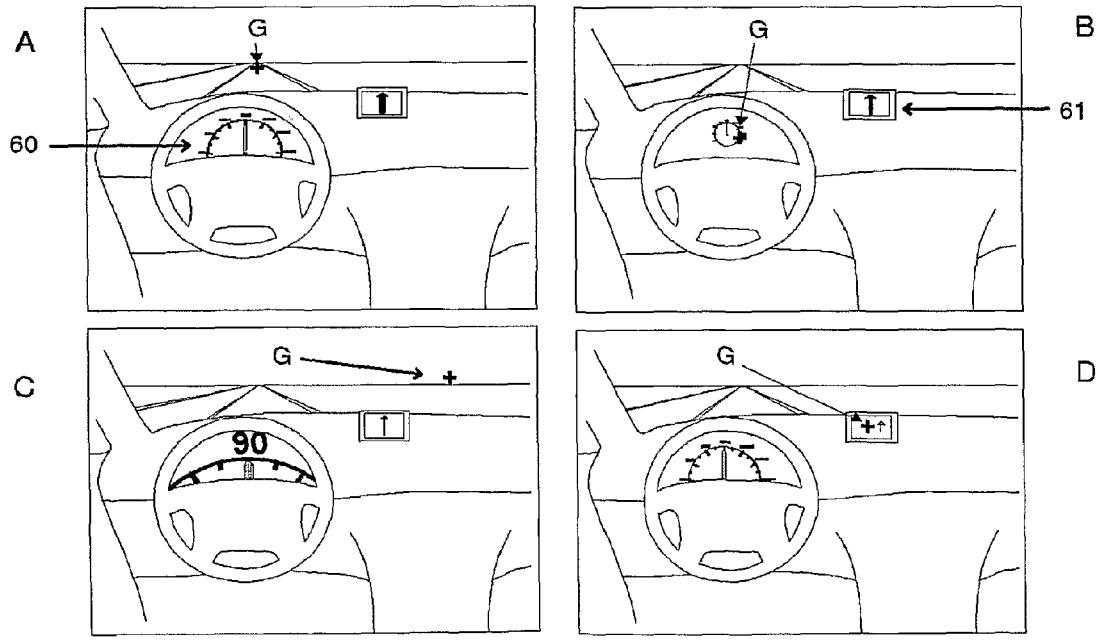
FIG. 7 shows examples of gaze-contingent peripheral-vision information presentation according to the invention using a second kind of display.

The magnifications and reductions of the size thickness of the presentations or reproductions of the indications in FIGS. 6 and 7 are conducted continuously in dependency on the actual distance between the gaze point G and the related indications at the first and second displays 50, 51; 60, 61.

Figure 8:
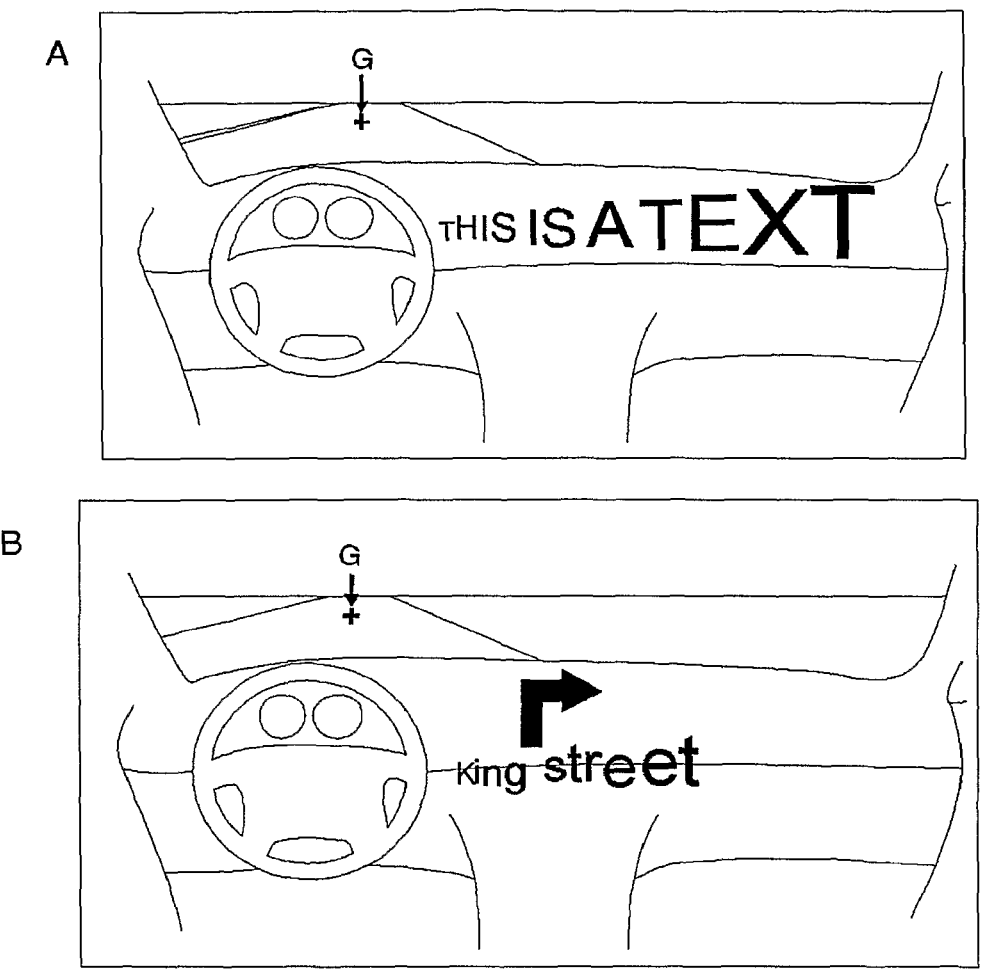
FIG. 8 shows examples of gaze-contingent peripheral-vision information presentation according to the invention using a third kind of display.

FIG. 8 shows another example of a gaze-contingent peripheral vision system for presenting information using a third type of display in which the information is projected by means of a display device, for example a laser projector 21 onto a dash board of the car or the information is projected on a visor or head mounted display. Exemplarily only the case is shown in which the driver looks straight ahead onto the road. This is again indicated by a cross by which the gaze point G is identified.

FIGS. 8A, B show a situation in which the presentation or reproduction of the information is a text string which is continuously enlarged with respect to size and thickness as the distance of the letters of the text string from the gaze point G increases. In FIG. 8B an arrow for example of a navigation system is imaged additionally with enlarged size wherein the letters of a related text string of the navigation system are projected as well with increasing size.

Figure 9:
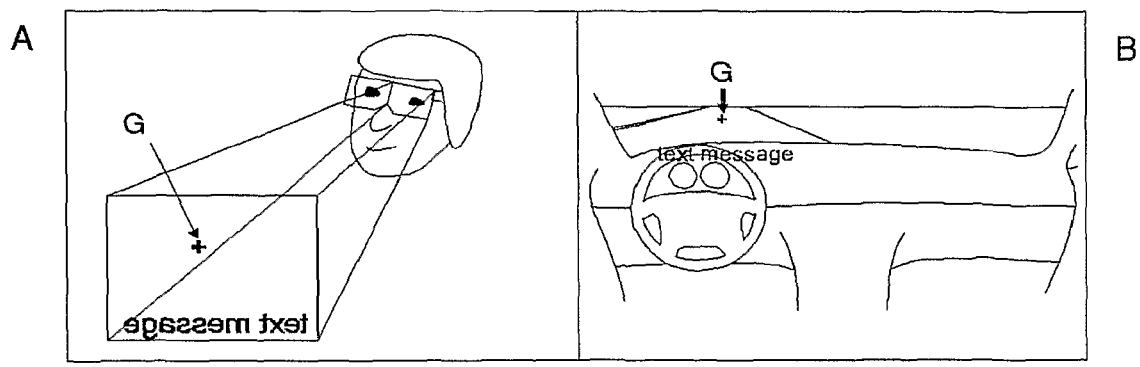
FIG. 9 is a clarification of the third kind of display according to FIG. 8.

FIG. 9 shows details of an example for a projection display in the form of a head mounted display.

FIG. 9A shows schematically in a three dimensional view how a "text message" is presented in the head mounted display relative to the gaze point G of the driver. FIG. 9B shows the driver's view using this head mounted display assuming that the driver is looking straight ahead onto the road which is again indicated by the gaze point G.

According to a third embodiment of the invention, the presentation of information can also follow the gaze position or gaze direction. For example, information can be presented by projecting or on a visor display to always be at a certain visual angle (e.g., 7 degrees down from the gaze direction or gaze point), independent of where the driver is looking at. In this case no continuous magnification or reduction of size and/or thickness of the presentation/reproduction of the information has to be conducted. Rather the size thickness of the image is fixed to a certain value in dependency on the visual angle of the image relative to the gaze direction under consideration of the loss of visual acuity with increasing eccentricity as explained with reference to FIGS. 1 and 2 above.

One advantage of this embodiment is that the foveal vision of the driver remains clear of any presented or reproduced information, but the information can be imaged near enough to the foveal vision to get enhanced attention of the driver.

An alternative implementation of this third embodiment is to use a display device in the form of a projector like e.g., a diode laser to project the information e.g., on top of the dashboard, always at between 20 to 30 degrees diagonally downwards.

Examples of information-types that could be presented or reproduced are current speed, navigation information, text messages, or gear information. If the technological prerequisites (like especially transponders, camera based image processing for sign recognition, information rich digital maps which are based on GPS or other navigation systems) are provided, then traffic information can be presented to the driver in a readable peripheral vision format. Examples of such traffic information are current speed limit, traffic lights, the texts and images found on current road signs, information regarding upcoming hazards etc.

Warning signals can be tailored to the gaze point or gaze direction as mentioned above. For example, a distraction warning involving moving spots or lights leading up towards road center, such as those described in WO 03/070093, which by reference shall be made to a part of this disclosure, can be optimally placed to start from where the driver's gaze point is.

Visual distraction warnings, cognitive distraction warnings, collision warnings, and lane-departure warnings can all be tailored to the gaze position or gaze direction of the driver. Ultimately the choice of what information is to be displayed could be made by the driver. However, any information that is legible or recognizable in the peripheral vision could be presented.

Finally, the preferred alternative embodiments of the methods and systems according to the invention shall be summarized as follows:

1.) Binary approach (foveal state or peripheral state) with a switch (for use with all display types) for the driver for switching peripheral state on/off. The displays have normal size in foveal state, and when the driver switches on the peripheral state, the displays show simplified, enlarged information. The displays do not change their state depending on gaze position (a driver can look directly at a display in the peripheral state) so that this embodiment works without an eyetracker.

2.) Binary approach (foveal state or peripheral state) with eyetracking sensor (for use with all display types). The raw gaze data is used to calculate and switch the displays between peripheral state and foveal state. When the driver looks at the road the displays are in peripheral state, when he looks away from the road the displays are set in foveal state. The displays do not show graded information but only have the two states.

3.) Graded information approach with eyetracking, wherein the size of information is tied to the visual angle between each display and the current gaze position, and using existing display technology as illustrated in FIGS. 6 and 7.

4.) Graded information approach with eyetracking, wherein the size of information is tied to the visual angle between each display and the current gaze position, and using laser projection or head mounted displays. FIGS. 8 and 9 show exemplary embodiments.

5.) Peripherally adapted information approach that follows gaze position, so that the information presented is always at a particular visual angle from gaze position. For example, speed or signs could be presented to always stay at 15 degrees straight down from gaze position. This means that when a driver looks at the left mirror they will be 15 degrees straight down from the mirror or if the driver looks at the radio they will be 15 degrees straight down form the radio. This presentation technique has to use the projector or the headmounted displays.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. Method for presenting or reproducing information at a fixed location with at least one display device regardless of a gaze direction or gaze point of the person, comprising:
   selecting by the person a presentation or reproduction of the same information by the at least one display device for recognition by foveal vision or by peripheral vision; and
   switching between selection of recognition by foveal vision and recognition by peripheral vision;
   wherein
   if recognition by foveal vision is selected, adapting the presentation or reproduction of the information at the fixed location with respect to at least one of its magnitude, size, contrast, and intensity such that the information can be recognized by the person in his foveal vision; and if recognition by peripheral vision is selected, adapting the presentation or reproduction of the information at the fixed location by enlarging at least one of its magnitude, size, contrast, and intensity according to a loss of acuity of the eye of the person with increasing eccentricity in the peripheral vision such that the information can be recognized by the person in his peripheral vision when his gaze is not directed at the display device.

2. Method according to claim 1, wherein predetermined types of information is presented or reproduced to be recognized by at least one of foveal vision and peripheral vision of the person.

3. Method according to claim 2, wherein safety related information is presented reproduced to be recognized by at least one of foveal vision and peripheral vision of the person.

4. Method according to claim 1, wherein the information is presented or reproduced with at least one display device in the form of an in-vehicle display or a head-up display.

5. A computer programmed with a program adapted to perform a method according to claim 1.

6. A system for presenting or reproducing information of a person's view comprising a computer which is connected to the internet, and a program adapted to perform a method according to claim 1 downloaded to the computer from the internet.

7. A computer readable medium comprising a computer executable program operable on a computer adapted to perform a method according to claim 1.

8. Method for presenting or reproducing information at a fixed location with at least one display device, comprising:
   detecting at least one of a gaze direction and a gaze point of the person;
   calculating and determining whether on the basis of the fixed location of the information as presented or reproduced on the at least one display in relation to the at least one of the gaze direction and gaze point, this information as presented or reproduced on the at least one display is in a foveal vision area or in a peripheral vision area of the person;
   controlling and/or adapting the at least one display device so that if the information as presented or reproduced on the at least one display is in the foveal vision area, the information is presented or reproduced in a normal magnitude, size, contrast and/or intensity according to the enhanced acuity in foveal vision, and if the information as presented or reproduced on the at least one display is in the peripheral vision area, the information is presented or reproduced by enlarging at least one of its magnitude, size, contrast and intensity to such an extent that the person can recognize the information in his peripheral vision when his gaze is not directed at the display device.

9. Method according to claim 8, wherein the information is presented or reproduced with at least one display device in the form of an in vehicle display or a head-up display.

10. Method according to claim 8, comprising continuously enlarging or reducing the at least one of the magnitude, size, contrast, and intensity of presentation or reproduction of the information depending on an increase or a decrease, respectively, of an angle between the gaze direction and the fixed location of the presentation or reproduction of the information.

11. Method according to claim 10, wherein the presentation or reproduction of the information is a text string, the at least one of the magnitude, size, contrast, and intensity of which is continuously enlarged as an angle between the letters of the text string and the gaze direction increases.

12. Method according to claim 8, comprising continuously enlarging or reducing the at least one of the magnitude, size, contrast, and intensity of presentation or reproduction of the information depending on an increase or a decrease, respectively, of a distance between the gaze point and the fixed location of the presentation or reproduction of the information.

13. Method according to claim 12, wherein the presentation or reproduction of the information is a text string, the at least one of the magnitude, size, contrast, and intensity of which is continuously enlarged as a distance of letters of the text string from the gaze point increases.

14. Method according to claim 8, wherein predetermined types of information is presented or reproduced to be recognized by at least one of foveal vision and peripheral vision of the person.

15. Method according to claim 14, wherein safety related information is presented or reproduced to be recognized by at least one of foveal vision and peripheral vision of the person.

16. A computer programmed with a program adapted to perform a method according to claim 8.

17. A system for presenting or reproducing information of a person's view comprising a computer which is connected to the internet, and a program adapted to perform a method according to claim 8 downloaded to the computer from the internet.

18. A computer readable medium comprising a computer executable program operable on a computer adapted to perform a method according to claim 8.

19. Method for presenting or reproducing information in a person's view with at least one projection or head mounted display device, comprising:
   detecting at least one of a gaze direction and a gaze point of the person;
   presenting or reproducing the information in a predetermined constant visual angle relative to the at least one of the gaze direction and the gaze point of the person such that the location of the presentation or reproduction of the information follows the at least one of the gaze direction and the gaze point of the person; and
   presenting or reproducing the information with an increase of at least one of the magnitude, size, contrast, and intensity in vision of the person as a function of the predetermined constant visual angle and according to a loss of acuity of the eye of the person with increasing eccentricity in the person's vision.

20. Method according to claim 19, wherein the presentation or reproduction of the information is a text string, the magnitude of which is continuously enlarged as a distance of letters of the text string from the gaze point increases.

21. Method according to claim 19, wherein the information is presented or reproduced in the person's peripheral vision.

22. Method according to claim 19, wherein predetermined types of information is presented or reproduced to be recognized by at least one of foveal vision and peripheral vision of the person.

23. Method according to claim 22, wherein safety related information is presented or reproduced to be recognized by at least one of foveal vision and peripheral vision of the person.

24. A computer programmed with a program adapted to perform a method according to claim 19.

25. A system for presenting or reproducing information of a person's view comprising a computer which is connected to the internet, and a program adapted to perform a method according to claim 19 downloaded to the computer from the internet.

26. A computer readable medium comprising a computer executable program operable on a computer adapted to perform a method according to claim 19.

27. System for presenting or reproducing information at a fixed location regardless of a gaze direction or gaze point of the person, comprising:
- at least one display device located in a person's view;
- a switching arrangement to be operable by the person for switching the system between a "Peripheral-Vision Information On"-state and a "Foveal-Vision information On"-state for a presentation or reproduction of the same information for recognition by peripheral vision or by foveal vision, respectively; and
- a control device for controlling the at least one display device according to the operation of the switch such that:
- if the system is switched into the "Foveal-Vision Information On"-state, the presentation or reproduction of the information at the fixed location is adapted with respect to at least one of its magnitude, size, contrast, and intensity such that the information can be recognized by foveal vision of the person, and
- if the system is switched into the "Peripheral-Vision Information On"-state, the presentation or reproduction of the information at the fixed location is enlarged with respect to at least one of its magnitude, size, contrast, and intensity according to a loss of acuity of the eye of the person with increasing eccentricity in the peripheral vision such that the information can be recognized by the person in his peripheral vision when his gaze is not directed at the display device.

28. System for presenting or reproducing information at a fixed location, comprising:
- at least one display device,
- a sensor for detecting at least one of a gaze direction and a gaze point of the person,
- a control device for calculating, and determining whether on the basis of the fixed location of the information in relation to the at least one of the gaze direction and gaze point, this information as presented of reproduced on the at least one display is in a foveal vision area or in a peripheral vision area of the person, the control device being arranged to control and/or adapt at least one display device so that if the information as presented or reproduced on the at least one display is in the foveal vision area, the information is presented or reproduced in a normal magnitude, size, contrast and/or intensity according to the enhanced acuity in foveal vision, and if the information as presented or reproduced on the at least one display is in the peripheral vision area, the information is presented or reproduced in an enlarged magnitude, size, contrast and/or intensity so that the person can recognize the information in his peripheral vision when his gaze is not directed at the display device.

29. System according to claim 28, wherein the control device continuously enlarges or reduces the at least one of the magnitude, size, contrast, and intensity of presentation or reproduction of the information depending on an increase or a decrease, respectively, of a distance between the gaze point and the fixed location of the presentation or reproduction of the information.

30. System according to claim 28, wherein the control device continuously enlarges or reduces the at least one of the magnitude, size, contrast, and intensity of presentation or reproduction of the information depending on an increase or a decrease, respectively, of an angle between the gaze direction and the fixed location of the presentation or reproduction of the information.

31. The system according to claim 28, wherein the display device is at least one of a laser projector, a head up or head down display, and a head mounted visor display.

32. Control device for controlling at least one display device in a system as set forth in claim 28, the control device being adapted to continuously enlarge or reduce the reproduction or presentation of the information at the fixed location with respect to at least one of its magnitude, size, contrast, and intensity according to a loss of acuity of a person's eye with increasing or decreasing eccentricity, respectively, in peripheral vision and depending on an output signal of a sensor for detecting the at least one of the gaze direction and gaze point of the person, and depending on an angle between the gaze direction and the fixed location of the presentation or reproduction of the information, for recognition in a peripheral vision of the person.

33. Control device for controlling at least one display device in a system as set forth in claim 28, the control device being adapted to continuously enlarge or reduce the reproduction or presentation of the information at the fixed location with respect to at least one of its magnitude, size, contrast, and intensity according to a loss of acuity of a person's eye with increasing or decreasing eccentricity, respectively, in peripheral vision and depending on an output signal of a sensor for detecting the at least one of the gaze direction and gaze point of the person, and depending on a distance between the gaze point and the fixed location of the presentation or reproduction of the information, for recognition in a peripheral vision of the person.

34. System according to claim 28, wherein the display device is a projection or head mounted display device.

35. System for presenting or reproducing information in a person's view, comprising:
- at least one projection or head mounted display device;
- a sensor for detecting at least one of a gaze direction and a gaze point of the person; and
- a control device for controlling: the at least one display device for presenting or reproducing the information in a predetermined constant visual angle relative to the at least one of the gaze direction and the gaze point and such that the location of the presentation or reproduction of the information follows the at least one of the gaze direction and the gaze point of the person, and the control device being arranged to control the at least one display device to present or reproduce the information with an increase of at least one of the magnitude, size, contrast, and intensity in a vision of the person as a function of the constant visual angle and according to a loss of acuity of the eye of the person with increasing eccentricity in the person's vision.

36. System according to claim 35, wherein the display device is at least one of a laser projector, a head up or head down display, and a head mounted visor display.

37. System according to claim 35, wherein the control device is arranged to control the at least one display device to present or reproduce the information in the person's peripheral vision.

38. Control device for controlling at least one display device in a system as set forth in claim 35, the control device being adapted to present or reproduce the information outside of the foveal vision of the person but in a location having the predetermined constant visual angle relative to the at least one of the gaze direction and the gaze point of the person, detected by the sensor, and independent of where the person is looking at, and to continuously enlarge the reproduction or presentation of the information with respect to at least one of its magnitude, size, contrast, and intensity with a fixed value in dependency on the constant visual angle and according to a loss of acuity of a persons eye with increasing eccentricity in peripheral vision and depending on an output signal of a sensor for detecting the at least one of the gaze direction and gaze point of the person, and depending on an angle between the gaze direction and the location of the presentation or reproduction of the information, for recognition in a peripheral vision of the person.

39. Control device for controlling at least one display device in a system as set forth in claim 35, the control device being adapted to present or reproduce the information outside of the foveal vision of the person but in a location having the predetermined constant visual angle relative to the at least one of the gaze direction and the gaze point of the person, detected by the sensor, and independent of where the person is looking at, and to continuously enlarge the reproduction or presentation of the information with respect to at least one of its magnitude, size, contrast, and intensity with a fixed value in dependency on the constant visual angle and according to a loss of acuity of a person's eye with increasing eccentricity in peripheral vision and depending on an output signal of a sensor for detecting the at least one of the gaze direction and gaze point of the person, and depending on a distance between the gaze point and the location of the presentation or reproduction of the information, for recognition in a peripheral vision of the person.

\* \* \* \* \*